US012103890B2

United States Patent
Mitra et al.

(10) Patent No.: US 12,103,890 B2
(45) Date of Patent: Oct. 1, 2024

(54) SUBSTRATE PROVIDED WITH A COATING BASED ON A GLASS FLUX, GLASS FLUX MATERIAL, AND METHOD FOR COATING A GLASS OR GLASS CERAMIC SUBSTRATE

(71) Applicant: SCHOTT AG, Mainz (DE)

(72) Inventors: Ina Mitra, Stadecken-Elsheim (DE); Matthias Bockmeyer, Mainz (DE); Friedrich Siebers, Nierstein (DE); Ina Joest, Essenheim (DE); Alexander Storch, Jena (DE); Matthias Seyfarth, Jena (DE); Michael Schwall, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/225,555

(22) Filed: Aug. 1, 2016

(65) Prior Publication Data

US 2016/0340232 A1  Nov. 24, 2016

Related U.S. Application Data

(63) Continuation of application No. PCT/EP2014/078448, filed on Dec. 18, 2014.

(30) Foreign Application Priority Data

Jan. 30, 2014  (DE) .......................... 102014101140.6

(51) Int. Cl.
*C03C 17/04* (2006.01)
*C03C 3/091* (2006.01)
(Continued)

(52) U.S. Cl.
CPC .............. *C03C 17/04* (2013.01); *C03C 3/091* (2013.01); *C03C 3/093* (2013.01); *C03C 8/02* (2013.01);
(Continued)

(58) Field of Classification Search
CPC .. C03C 3/064; C03C 8/02; C03C 8/14; C03C 3/093; C03C 2217/485; C03C 2217/452;
(Continued)

(56) References Cited

U.S. PATENT DOCUMENTS

| | | | | |
|---|---|---|---|---|
| 4,925,814 A | * | 5/1990 | Fine ......................... | C03C 3/11 501/66 |
| 5,357,079 A | * | 10/1994 | Henry .................... | H05B 3/746 126/211 |

(Continued)

FOREIGN PATENT DOCUMENTS

| | | |
|---|---|---|
| CA | 2279785 | 2/2000 |
| DE | 19834801 A1 | 2/2000 |

(Continued)

OTHER PUBLICATIONS

Translation—JPH0930834A; Feb. 1997, Kiyoshi et al.*
(Continued)

*Primary Examiner* — Humera N. Sheikh
*Assistant Examiner* — Elizabeth D Ivey
(74) *Attorney, Agent, or Firm* — Ruggiero McAllister & McMahon LLC

(57) ABSTRACT

A glass flux material for applying an opaque coating is provided. The glass flux material includes at least one pigment and a glass component with the following composition:
$SiO_2$ 55-70 mol %,
$Al_2O_3$ 2.5-8 mol %,
$Bi_2O_3$ 0.5-<4 mol %,
$B_2O_3$ 14-27 mol %,
with at least 2.5 mol % of at least one oxide of the group $Li_2O$, $Na_2O$, and $K_2O$, wherein the ratio of alkali oxides to aluminum oxide $\Sigma R_2O/Al_2O_3$ is less than 6.

26 Claims, 4 Drawing Sheets

(51) Int. Cl.
  *C03C 3/093* (2006.01)
  *C03C 8/02* (2006.01)
  *C03C 8/14* (2006.01)
  *C03C 8/20* (2006.01)
(52) U.S. Cl.
  CPC .............. *C03C 8/14* (2013.01); *C03C 8/20* (2013.01); *C03C 2204/04* (2013.01); *C03C 2205/02* (2013.01); *C03C 2209/00* (2013.01); *C03C 2209/02* (2013.01); *C03C 2217/213* (2013.01); *C03C 2217/214* (2013.01); *C03C 2217/228* (2013.01); *C03C 2217/29* (2013.01); *C03C 2218/119* (2013.01); *C03C 2218/32* (2013.01)
(58) Field of Classification Search
  CPC ........... C03C 2217/48; C03C 2217/72; C03C 2217/70; C03C 2204/04; C03C 2205/02
  See application file for complete search history.

(56) References Cited

U.S. PATENT DOCUMENTS

| | | | |
|---|---|---|---|
| 5,605,869 A | 2/1997 | Mangat et al. | |
| 6,043,171 A | 3/2000 | Siebers et al. | |
| 8,673,461 B2* | 3/2014 | Pelletier | C03C 3/085 428/426 |
| 8,877,327 B2* | 11/2014 | Hoffmann | C03C 17/42 428/195.1 |
| 2004/0091718 A1* | 5/2004 | Striegler | C03C 17/007 428/426 |
| 2008/0289619 A1* | 11/2008 | Schjerven, Sr. | A47J 37/044 126/41 R |
| 2010/0167091 A1* | 7/2010 | Tachiwana | C03C 3/087 428/828 |
| 2011/0014475 A1* | 1/2011 | Murata | C03B 17/064 428/410 |
| 2012/0263957 A1* | 10/2012 | Chopinet | C03C 3/089 428/428 |
| 2013/0158485 A1 | 6/2013 | Siebers et al. | |
| 2013/0273320 A1* | 10/2013 | Bockmeyer | C03C 17/007 428/147 |
| 2013/0327740 A1* | 12/2013 | Adib | C03C 3/087 215/379 |
| 2014/0341883 A1* | 11/2014 | Weeks | C03C 3/087 424/130.1 |
| 2015/0144613 A1* | 5/2015 | Guillemot | C03C 17/02 219/460.1 |

FOREIGN PATENT DOCUMENTS

| | | | |
|---|---|---|---|
| DE | 10243500 | 4/2004 | |
| DE | 102011089045 | 6/2013 | |
| EP | 0518610 | 12/1992 | |
| GB | 1166184 | 10/1969 | |
| GB | 2301100 | 11/1996 | |
| JP | H0930834 | 2/1997 | |
| JP | H0930834 A * | 2/1997 | ............ C03C 17/04 |
| JP | 2012085752 | 5/2012 | |
| SU | 1730066 | 4/1992 | |

OTHER PUBLICATIONS

Hunter L,a,b Color Scale; vol. 8, No. 9; https://www.hunterlab.se/wp-content/uploads/2012/11/Hunter-L-a-b.pdf.*
English translation of Written Opinion dated Mar. 5, 2015 for corresponding PCT/EP2014/078448, 10 pages.
English translation of International Preliminary Report on Patentability dated Aug. 2, 2016 for corresponding PCT/EP2014/078448, 13 pages.
English translation of International Search Report dated Mar. 5, 2015 for corresponding PCT/EP2014/078448, 3 pages.

* cited by examiner

SUBSTRATE PROVIDED WITH A COATING BASED ON A GLASS FLUX, GLASS FLUX MATERIAL, AND METHOD FOR COATING A GLASS OR GLASS CERAMIC SUBSTRATE

CROSS REFERENCE TO RELATED APPLICATIONS

This application is a continuation of International Application No. PCT/EP2014/078448 filed on Dec. 18, 2014, which claims the benefit under 35 U.S.C. §119(a) of German Application No. 10 2014 101 140.6 filed Jan. 30, 2014, the entire contents of which are incorporated herein by reference.

BACKGROUND

1. Field of the Invention

The invention relates to a glass flux material for applying a preferably opaque coating, to a method in which the glass flux material is employed for applying a preferably opaque coating, and to a glass or glass ceramic substrate provided with a glass flux-based coating. More particularly, the invention relates to the coating of heat-resistant glass and glass ceramic substrates with a preferably opaque coating.

2. Description of Related Art

To provide heat-resistant transparent sheets and other products such as bottles, tubes and other hollow bodies, glasses are usually used that exhibit a low coefficient of thermal expansion, in particular borosilicate glasses and aluminosilicate glasses.

Examples of borosilicate glasses include Borofloat33®, Borofloat40®, Fiolax®, Duran®, and Pyrex. Borosilicate glasses are characterized by substantial proportions of silica ($SiO_2$) and boric acid ($B_2O_3 > 8\%$) as glass formers. The amount of boric acid content has an influence on the properties of the glass, in particular in that besides glasses that are known to be highly resistant ($B_2O_3$ of not more than a maximum of 13%), there are also glasses that exhibit only low chemical resistance, due to a different type of structural incorporation of the boric acid ($B_2O_3$ contents of $>15\%$). Therefore, subgroups are distinguished as follows:

Borosilicate glasses free of alkaline earths: Typically, $B_2O_3$ content is from 12 to 13%, and $SiO_2$ content is >80%. Because of their high chemical resistance and low thermal expansion these glasses are particularly suitable for chemical-technical equipment, piping, and laboratory devices.

Borosilicate glasses containing alkaline earths: In addition to about 75% of $SiO_2$ and 8 to 12% of $B_2O_3$, these glasses contain up to 5% of alkaline earths and aluminum oxide. These glasses have a higher coefficient of thermal expansion but are highly resistant to chemicals.

Borosilicate glasses with a high content of boric acid: Glasses with $B_2O_3$ contents from 15 to 25%, with 65 to 70% of $SiO_2$, and with alkali oxides and aluminum oxide. These glasses exhibit a low softening point and low thermal expansion and are suitable for fusion fitting to metals, in particular tungsten-molybdenum. Furthermore, these glasses provide for particularly good electrical insulation. However, the elevated $B_2O_3$ content reduces chemical resistance.

In particular for heat resistant sheets for various applications, glass ceramics can be used in addition to borosilicate glasses.

For various purposes it is desirable to provide the glass or glass ceramic substrate with a coating, at least in portions thereof.

In particular black or white coatings are used for designing a frame or for applying labels.

Conventional glass flux-based coatings are usually not suitable, at least not as a single layer system, for applying an opaque coating on substrates having a low coefficient of thermal expansion. This is partly due to the fact that the thermal expansion coefficient of an enamel applied using the glass flux is so different from that of the substrate that only thin layers can be applied, if any. Therefore, it is not possible to achieve the layer thicknesses needed for an opaque coating.

This is especially true for lead oxide-free glass flux materials. Such a material is disclosed, for example, in DE 198 34 801 C2 (Schott Glas).

Published patent document EP 0 518 610 B1 (Cookson Group) also discloses a lead-free glass flux material. However, such a material has a relatively high softening point, so that it has to be fired at more than 750° C. This temperature is too high for heat-resistant glasses like borosilicate glasses. In order to be able to omit lead oxides, a high proportion of bismuth may be used. However, this increases manufacturing costs.

JP 2012085752 A discloses a pharmaceutical packaging consisting of a glass ampoule which has an ink coating with a defined composition. The composition of the coating contains 0.5-30 wt % of $Al_2O_3$, 3-25 wt % of ZnO, 20-40 wt % of $SiO_2$, 3-15 wt % of $B_2O_3$, 1-5 wt % of $Na_2O$, 0.5-5 wt % of $Li_2O$, 3-10 wt % of BaO, 10-25 wt % of $Bi_2O_3$, and further oxides for coloring purposes. Due to the relatively low $SiO_2$ contents of 20 to 40 wt %, there are drawbacks in particular in terms of acid resistance.

Published patent application DE 10 2011 089 045 A1 discloses a syringe made of borosilicate glass and having a cone coating which increases surface roughness. This document describes two glass systems which serve as a basis for suitable glass flux materials for coating. The first one is the $Bi_2O_3$—$B_2O_3$—$SiO_2$ glass system: This glass system includes 40-65 wt % of $Bi_2O_3$, 3-20 wt % of $B_2O_3$, and 10-30 wt % of $SiO_2$ as main components forming the glass skeleton. The high contents of $Bi_2O_3$ are favorable for lowering the firing temperature, as they lower the softening point E. A drawback of these high contents is an increase in the coefficient of thermal expansion. Therefore, this glass system is not suitable for coating low expansion glass or glass ceramic substrates, because it only allows for thin layer thicknesses and there is a risk of flaking of the layer. The second glass system described is the ZnO—$B_2O_3$—$SiO_2$ glass system. Main components are 15-48 wt % of ZnO, 8-40 wt % of $B_2O_3$, and 8-52 wt % of $SiO_2$. With this glass system it is possible to obtain comparatively low thermal expansion coefficients of $5*10^{-6}$/K, measured between 20 and 300° C. However, the high minimal content of ZnO of 15 wt % is disadvantageous in terms of the chemical resistance of the coatings obtained.

Finally, good chemical resistance is desired for glass flux materials, especially to acids, bases, and alcoholic solvents. As regards hydrolytic resistance, this is important under the conditions of autoclaving above 100° C.

Furthermore it is important for glass flux materials to be easily processible. In particular in the case where substrates are printed only in sections thereof, spraying processes are not very suitable. Therefore, the glass flux material need to be suited to produce a printable paste therefrom, in particular a screen-printable paste.

Alternatively, organic and hybrid polymer coating materials (sol-gel) are used to provide opaque coatings.

Application of such organic materials is usually cost and time consuming, in order to provide an opaque coating they often need to be applied as a multilayer system, and for many applications they do not have the necessary mechanical stability in terms of scratch resistance and insufficient thermal and/or chemical resistance.

SUMMARY

Therefore, the invention is based on the object of providing a lead-free glass flux material for substrates having a low thermal expansion coefficient, which preferably allows for opaque, scratch-resistant and chemically resistant coatings.

In particular a single layer coating should be provided which is cost-efficient and which can be fired at a temperature below 750° C. and in particular below 700° C. For glass substrates that tend to deform during firing, such as for example glass containers with a thin glass wall thickness, the firing temperature should preferably be below 660° C.

The object of the invention is achieved by a glass flux material for applying an opaque coating, by a method for coating a glass or glass ceramic substrate, and by a glass or glass ceramic substrate as disclosed herein.

The invention relates to a glass or glass ceramic substrate provided with a preferably opaque coating which is coated using a glass flux material, i.e. an enamel.

The glass flux material is in particular provided in the form of a glass frit with added pigments, a powder or a paste, especially as a printable paste. The glass flux material is also referred to as enamel. The material to be fused in particular contains the ground glass frits.

In order to prepare a printable paste, the glass component is ground. In particular, the glass component is ground so as to have a particle size distribution with a $d_{50}$ between 0.5 and 15 µm, preferably between 1 and 5 µm, more preferably between 1.2 and 2.5 µm. This means that 50% of the particles have a size below the $d_{50}$ value and 50% above the $d_{50}$ value.

The so obtained powder is mixed with pigments and is processed into a screen printing paste by adding a screen printing oil, in particular on a pine oil basis. For example, an acrylate-based screen printing oil with additions of solvent (s) and additive(s) and with a viscosity adjusted through the composition thereof, which is suitable for screen-printing processes, can be used.

In order to ensure optimum processability of the glaze raw materials, various auxiliaries, additives, solvents, thixotropic agents, etc. may be added, depending on the coating method. The necessary usually organic additives will evaporate during firing.

In particular haze effects are achieved, for example, by adding so-called fillers, e.g. $ZrO_2$, $TiO_2$, $ZrSiO_4$, etc. It should be considered here that the addition of further components might also alter the use properties of the glaze, starting with melting and reactive behavior to chemical resistance and strength of the decorated substrate.

Homogenization of the paste may be performed in a three roller mill, for example.

For the pigments, commercially available pigments can be used individually or as a pigment mixture, which may already be available in form of a powder.

Preferably metal oxides are used for the pigments. These may in particular include: cobalt oxides/spinels, cobalt-aluminum spinels, cobalt-titanium spinels, cobalt-chromium spinels, cobalt-nickel-manganese-iron-chromium oxides/spinels, cobalt-nickel-zinc-titanium-aluminum oxides/spinels, iron oxides, iron-chromium oxides, iron-manganese oxide/spinels, iron-chromium-zinc-titanium oxide, copper-chromium spinels, nickel-chromium-antimony-titanium oxides, titanium oxides, zirconium-silicon-iron oxides/spinels etc. Moreover, any conceivable absorption pigments may be taken into consideration as the pigments, in particular platelet- or rod-shaped pigments. In particular white or black pigments are used. A preferred embodiment of the invention therefore relates to the production of composite materials which are provided with an opaque white or black coating.

However, it is also conceivable to use colored pigments and/or effect pigments.

The pigment content is preferably in a range from 10 to 60 wt %, preferably from 15 to 55 wt %, based on the solids content.

In the case of a printable paste, the viscosity of the paste is preferably adjusted to a range between 1 and 7 Pa·s by adding an oil.

Essential for the glass flux material is the composition of the glass component.

The glass component which is used comprises from 55 to 70 mol %, preferably at least 58 mol % of silicon oxide, more preferably at least 60 mol % of silicon oxide, and most preferably not more than 65 mol % of silicon oxide; from 3 to 8 mol %, preferably from 2.5 to 6 mol % of aluminum oxide; from 0.5 to less than 4 mol %, preferably from 0.5 to 3 mol %, more preferably from 0.5 to 2 mol % of bismuth oxide; and from 14 to 27 mol %, preferably from 18 to 25 mol % of boron oxide.

These composition data do not relate to the entire glass flux material, which as stated above further contains pigments and optionally substances for preparing a paste, but to the glass component that is used, which preferably is provided in the form of a powder and which is in particular prepared from a glass frit.

Furthermore, the glass component comprises at least 2.5 mol % of at least one oxide of the group of oxides comprising lithium oxide, sodium oxide, and potassium oxide, and the ratio of alkali oxides to aluminum oxide, that means the sum $R_2O/Al_2O_3$, is less than 6. Preferably, this ratio is less than 4.5 and in a further preferred embodiment it is less than 4 and in particular less than 3.5. Preferably, this ratio is greater than 1.

In a preferred embodiment of the invention, the proportion of bismuth oxide is less than 3.5 mol %, preferably less than 3 mol %, and more preferably less than 2 mol %.

Preferably, the content of lithium oxide is between 0 and 15 mol %, the content of sodium oxide is between 0 and 12 mol %, and the content of potassium oxide is between 0 and 4 mol %. In a preferred embodiment, the proportion of alkali oxides is at least 6 mol %, more preferably at least 8 mol %. Preferably, the sum of the alkali oxides is less than 18 mol %, more preferably less than 16 mol %.

A particularly preferred embodiment of the invention comprises between 60 and 65 mol % of silicon oxide, between 2.5 and 5 mol % of aluminum oxide, between 1.2 and 2 mol % of bismuth oxide, between 20 and 25 mol % of boron oxide, and between 5 and 15 mol % of lithium oxide, and a ratio of alkali oxides to aluminum oxide is between 1 and 3.5.

With a glass flux material according to the invention, an opaque enamel may be provided which has a softening point $E_w$ of less than 680° C. It was in particular possible to achieve softening points below 650° C.

The softening point is also referred to as dilatometric softening point at which $\lg(\eta)=7.6$ applies. It can be determined according to DIN ISO 7884-8.

With the invention, a layer thickness of more than 4 µm, particularly preferably of more than 5 µm can be achieved even on glass or glass ceramic substrates having a coefficient of linear thermal expansion α (at 20° C. to 300° C.) of up to $5.5*10^{-6}$/K, preferably of less than $4.5*10^{-6}$/K, more preferably of less than $3.5*10^{-6}$/K. The layer preferably has a thickness of up to 30 µm, and especially up to 10 µm.

In the context of the invention, linear thermal expansion is determined as an average over a temperature range between 20° C. and 300° C. The determination can be made according to DIN ISO 7991.

The coefficient of linear thermal expansion α of the molten glass flux material is less than $7*10^{-6}$/K, preferably less than $6*10^{-6}$/K, and in particular less than $5.5*10^{-6}$/K.

The inventors have found that the following rules apply in the glass system described above.

Silicon oxide reduces the coefficient of thermal expansion and increases chemical resistance. But at the same time silicon oxide increases the softening point of the glass.

Aluminum oxide has a positive effect on chemical stability, but also increases the softening point.

Bismuth oxide lowers the softening point. However, it has been found that in the glass system described above a bismuth oxide content of less than 4% is already sufficient to obtain softening points below 650° C.

Boron oxide lowers the coefficient of thermal expansion and may increase chemical resistance, at least to a small extent. Furthermore, boron oxide lowers the softening point. Contents higher than 27 mol % are unfavorable in terms of chemical resistance.

Alkali oxides increase the coefficient of linear thermal expansion but are associated with reduced chemical resistance. Furthermore, alkali oxides reduce the softening point of the glass.

It will be understood that the glass of the invention may contain further components, in particular, as contemplated according to a refinement of the invention, up to 2 mol % of zirconium oxide and/or titanium oxide may be added, and up to 3 mol % of a respective one of alkaline earth oxides, especially magnesium oxide, calcium oxide, barium oxide, or strontium oxide, and/or up to 3 mol % of tin oxide.

Zirconium oxide and titanium oxide have a positive effect on the chemical resistance of the glass, but are associated with an increase of the softening point. These additives are particularly useful when the glass flux material is used as a coating material for glass ceramics, since on a glass ceramic the glass flux material can be fired at a higher temperature. Particularly suitable for this purpose is zirconium oxide. Alkaline earth metals may in particular be used to optionally adjust the viscosity behavior of the glass flux material.

Further possible constituents preferably amount to a proportion of less than 5 mol %.

With the invention it was made possible to fire an opaque coating at a temperature of less than 750° C. on a substrate with a coefficient of linear thermal expansion of less than $4.5*10^{-6}$/K, preferably less than $4*10^{-6}$/K.

The material can be easily applied by a printing process, in particular by screen printing or pad printing in case of curved substrates. Other coating methods, such as through a wheel that rotates in ink slurry, pins, dispensers, or recently inkjet printing are likewise possible with pastes or slurries of appropriately adapted viscosity.

For an application on curved substrates, the glass flux material may as well be processed into a decal and then be applied as a decal onto curved substrates, in particular areas, rods, or tubes.

Further applications include tempered and non-tempered glasses, in particular heat-resistant glass sheets.

In this case, a glass flux-based ink has the advantage that it can withstand thermal processing steps of the substrate glass. Depending on the employed glass or the employed glass ceramic it is also conceivable to apply the glass flux material prior to bending or prior to the ceramization of a substrate.

Another application is the use on multilayer laminated glass panes.

These are laminated by means of polymeric intermediate layers to form a composite material.

In case of such laminated glass, in particular bullet-proof laminated glass, it is also conceivable to apply the glass flux material prior to lamination. The glass flux material may even be disposed between two layers of the laminate without getting damaged in a lamination process. Here the glass flux material according to the invention benefits from its high mechanical resistance.

Furthermore, the coating material is particularly useful in the kitchen area, for ovens and stoves, for fireplace windows and fire protection doors, and for pharmaceutical packaging made of glass.

The invention further relates to a glass or glass ceramic substrate provided with a glass flux-based coating, which has a coefficient of linear thermal expansion α between 20° C. and 300° C. of less than $5.5*10^{-6}$/K, preferably less than $4.5*10^{-6}$/K, and more preferably less than $3.5*10^{-6}$/K, wherein the glass flux-based coating has a coefficient of linear thermal expansion α of less than $7*10^{-6}$/K, preferably less than $5.5*10^{-6}$/K, and wherein in the visible wavelength range (from 380 to 780 nm) the glass flux-based coating has a transmittance of less than 1%, preferably less than 0.5%.

The glass flux-based coating is in particular provided in the form of a single layer coating material.

For the first time, the invention enables to provide low-expansion glasses and glass ceramics with an opaque enamel layer which is not prone to spalling.

The glass flux-based coating preferably comprises pigments with a degree of volume filling from 20 to 60%, preferably from 30 to 50%.

This degree of volume filling refers to the fired coating.

It will be understood that due to evaporation and/or diffusion processes the composition of the glass component in the fired coating may differ from the glass component of the glass flux material.

The invention permits to provide single layer enamel coatings which, if designed as a white or black layer, have an L* value of more than 86 or of less than 28 and preferably less than 27 in the L*a*b* color space.

The a* value and the b* value in the L*a*b* color space are each preferably smaller than 1, more preferably smaller than 0.5.

That means, both white and black coatings of high brilliance can be applied.

In one embodiment of the invention, the glass ceramic substrate provided with the coating of the invention is a crystallized lithium aluminum silicate glass. It may in particular be used as a fireplace window. A preferred use is in the form of a fireplace window with an opaque coating in the peripheral area.

The glass substrate provided with the coating according to the invention is preferably employed as a fire protection glass, oven viewing window (especially for pyrolysis ovens), cover for lighting devices, as security glazing, optionally as part of a laminate, especially in the form of bullet-proof glass, for installations or linings in furnaces, and as a pharmaceutical packaging made of glass.

Preferably, a difference in the thermal expansion coefficients of the glass frit and of the coated glass substrate is less than $2*10^{-6}$, preferably less than $1.5*10^{-6}$, and more preferably less than $1*10^{-6}$/K.

Due to the small difference in the coefficients of thermal expansion good matching is achieved. High layer thicknesses of more than about 7 to 30 µm can be obtained without causing spalling or cracking as a result of excessively high stresses between coating and glass substrate. Because of the high layer thicknesses, good color saturation and opacity of the inks is achieved. By contrast, the commercially available decorative inks for coating pharmaceutical packaging made of glass only allow for lower layer thicknesses, since they have coefficients of thermal expansion of about $6*10^{-6}$/K and higher.

One use are pharmaceutical glass containers. Pharmaceutical packaging which are provided with the coating according to the invention preferably include syringes, ampoules, cartridges, and vials. One example of such glass substrates is the glass FIOLAX® of company SCHOTT, which is available in two versions, as FIOLAX® clear, glass no. 8412 of SCHOTT AG, and as FIOLAX® amber, glass No. 8414. The former has an expansion coefficient of $4.9*10^{-6}$/K, the second an expansion coefficient of $5.5*10^{-6}$/K, measured between 20° C. and 300° C. The coating may serve to apply markings or inscriptions, for example.

Other uses are based on coated flat or curved sheets of borosilicate glass. An example of such a substrate made of borosilicate glass is floated BOROFLOAT® of company SCHOTT AG, which is available in the versions BOROFLOAT® 3.3 and BOROFLOAT® 4.0, with expansion coefficients of 3.3 and $4.0*10^{-6}$/K, respectively, measured between 20 and 300° C. A preferred use on the basis of this coated substrate is security glazing in a laminated composite with intermediate polymer layers. At least one sheet is provided with an opaque coating in the peripheral area thereof. The preferred use is security glazing in a vehicle with ballistic protection.

Another preferred use of the coated borosilicate glass sheet is as an oven window, in particular in an oven with pyrolytic cleaning. Since elevated temperatures will occur during pyrolysis, this embodiment is advantageous compared to conventional oven windows made of tempered soda-lime glass, due to its higher temperature resistance.

Another preferred use is coated fire protection glazing with single panes or laminated composites of borosilicate glass panes.

Table 1 below gives six exemplary compositions for the respective glass component.

In particular, it can be seen that the softening point of examples 1 to 3 as well as 5 and 6 is between 600 and 645° C., and that for the first three glass components the coefficient of linear thermal expansion is about 5. Furthermore, the working point Va, at which lg(n)=4, is given.

Example 4 is a glass flux component preferably used for glass ceramics. It has a higher softening point and a sodium oxide content of more than 5 mol %.

Examples 5 and 6 include a somewhat higher content of bismuth oxide, but in turn a lower softening point than Example 4, so that these compositions are suitable even for glass substrates which require a lower firing temperature.

TABLE 1

(composition given in mol %)

|  | Glass 1 | Glass 2 | Glass 3 | Glass 4 | Glass 5 | Glass 6 |
|---|---|---|---|---|---|---|
| $SiO_2$ | 62.9 | 62 | 61.3 | 66.5 | 63.0 | 61.4 |
| $Al_2O_3$ | 4.8 | 3.5 | 3.3 | 5.45 | 3.5 | 3.6 |
| $Bi_2O_3$ | 1.45 | 1.4 | 1.6 | 2.4 | 2.2 | 2.2 |
| $B_2O_3$ | 22.25 | 23 | 22.5 | 19.1 | 20.1 | 20.4 |
| $Li_2O$ | 7.3 | 9.8 | 10.7 |  | 10.5 | 10.6 |
| $Na_2O$ | 1.3 | 0.3 |  | 6.55 |  |  |
| $K_2O$ |  |  | 0.6 |  | 0.7 | 0.7 |
| $ZrO_2$ |  |  |  |  |  | 1.1 |
| $\Sigma R_2O/Al_2O_3$ | 1.8 | 2.9 | 3.2 | 1.2 | 3.2 | 3.1 |
| CTE [20; 300° C.] * ppm/K | 4.7 | 4.8 | 5.1 | 5.4 | 5.3 | 5.3 |
| Tg [° C.] | 460 | 470 | 470 | 480 | 460 | 465 |
| Ew [° C.] | 645 | 610 | 600 | 700 | 600 | 605 |
| Va [° C.] | 955 | 860 | 840 | 1075 | 855 | 860 |

Glass examples 1 to 4 listed in Table 1 were processed as a finely ground powder using a commercially available screen printing oil and with an admixture of 45 vol % of a Cu—Cr-spinel pigment to give a black appliable paste, and were applied on a borosilicate glass having a coefficient of linear thermal expansion α of $3.3*10^{-6}$/K using a screen printing method.

Firing of the layers was performed in a conventional tempering furnace.

Table 2 gives the firing conditions and the obtained layer thicknesses as well as the color values in the L*a*b* color space. The temperatures indicated as firing condition were measured on the substrates.

As can be seen, with all four glass compositions it was possible to produce black layers of high brilliance.

Moreover, the layers applied according to the invention exhibit high mechanical resistance, i.e. they are scratch-resistant, and no color changes occurred, not after autoclaving of a composite nor after bending of a sheet.

TABLE 2

|  | Example 1 | Example 2 | Example 3 | Example 4 |
|---|---|---|---|---|
| Firing condition | 670° C./ 3 min | 670° C./ 10 min | 670° C./ 10 min | 700° C./ 10 min |
| Layer thickness [µm] | 7.9 | 5.9 | 5.2 |  |
| Color values: |  |  |  |  |
| L* | 25.75 | 26.55 | 25.5 | 25.7 |
| a* | −0.03 | −0.07 | −0.03 | −0.01 |
| b* | −0.81 | −0.97 | −0.87 | −0.63 |

Scratch resistance was determined using a sclerometer (Elcometer 3092). A sclerometer is a hardness testing device which analyses hardness by moving a 1 mm WC tip over the surface under a predetermined contact force.

The body of the device includes a stylus having a tip and equipped with a screw cap, to which a spring with printed scale exerts a pressure. The contact pressure of the spring is adjusted by means of a locking screw. Upon compression of the spring the pressure at which the tip is pressed against the surface of the sample increases. By scoring along a straight line with increasing pressure, the point can be determined at which the tip leaves a mark or destroys the coating.

Scratch resistance was tested on the exemplary embodiments under a load of 1000 g, 1500 g, and 2000 g. The coatings of the invention did not exhibit any scratch mark after these tests.

For the exemplary embodiments, chemical resistance was assessed over an exposure period of 24 h at room temperature using different substances: The test substances citric acid (10%), acetic acid (5%), and ethanol were applied to the decorated sample, and after an exposure duration of 24 h the samples were cleaned with water.

The cleaning behavior was additionally evaluated by using commercially available cleaners like Sidolin® Citrus and an alkaline cleaner (Bref®). Visually it was found that after the test with the substances mentioned above no damage to the decorated layer, no stains or cleaning traces were detected.

In a further exemplary embodiment 5, the glass flux according to Example 1 was processed into a colored-gray ink paste using 45% of a mixture of commercially available black, white, and blue pigments on the basis of spinels and rutile ($TiO_2$) and screen printing oil.

In a further exemplary embodiment 6, the glass flux according to Example 1 was processed into a white ink paste using 45% of a commercially available white pigment based on rutile ($TiO_2$) and screen printing oil.

The application was accomplished on a flat glass substrate of the borosilicate type of SCHOTT AG using conventional screen printing technology. Firing was also effected in a commercially available furnace:

| Glass no | Example 1 |
|---|---|
| Firing condition | 690° C./15' |
| Color values: | |
| L* | 88.2 |
| a* | −1.7 |
| b* | −1.5 |

In a further exemplary embodiment 7, a black ink based on glass composition no. 4 was applied on an already ceramized substrate of a zero expansion transparent glass ceramic sheet, ROBAX® of SCHOTT AG.

Firing of the ink was performed at about 720° C. for 10 minutes in a conventional furnace to form a black opaque decoration with a layer thickness of 5.2 μm.

In a further exemplary embodiment 8, the glass flux with a glass composition according to glass 2 was ground into a glass powder with an average grain size of 1.8 μm.

85 wt % of the resultant glass powder was mixed with 15 wt % of a commercially available white pigment consisting of rutile, and was processed with an admixture of an oil-based organic pasting agent to give a paste. The pasting ratio was 10 parts by weight of powder to 6.5 parts by weight of oil.

The paste was homogenized in usual manner using a three roller mill. The obtained paste (viscosity of 2.5 Pa·s at a shear rate of 200 $s^{-1}$ and a temperature of 23° C.) was coated on a glass substrate made of a borosilicate glass of the FIOLAX® type, glass no. 8412 of company SCHOTT AG, that exhibits a thermal expansion of $4.9*10^{-6}$/K in the temperature range 20-300° C.

This type of glass is preferably used for pharmaceutical packaging. Coating was performed using a screen printing process. The coated glass substrate was fired in a furnace. For firing, the dried printed glass substrates were placed in a furnace that was preheated to 400° C. At a heating rate of 15° C./min, the glass substrates were heated to 650° C., holding time 5 min. Then, the furnace was rapidly cooled with the door open.

After firing, an average thickness of 10 μm was measured. An evaluation of the coating with the naked eye and under an optical microscope showed no signs of cracking or spalling. Abrasion resistance of the coating was evaluated in a scratch test with a metal ruler. By scratching over the printed surface with an edge of the metal ruler it was found that no layer components were scraped. Gloss and roughness of the coating therefore met the requirements.

Chemical resistance was determined according to the requirements imposed on pharmaceutical packaging made of glass.

In accordance with DIN ISO 4794, the resistance to hydrochloric acid was tested (1 hour in hydrochloric acid, C=2 mol/l at 23° C.). The evaluation of color change was made according to ASTMC 724-91, with grades between 1 and 7. Here, 1 stands for "no visible attack", and 7 stands for "complete removal of ink". The evaluation resulted in a grade 1 classification, which means no visible attack.

According to ASTMC 724-91, chemical resistance to 10% citric acid was tested (15 min at 20° C.). Here, too, the result was a grade 1 classification, that means no visible attack.

In accordance with EP 7.8, 2013, hydrolytic resistance was assessed under the conditions of autoclaving for 1 hour at 121° C., followed by a visual inspection of the color change according to ASTMC 724-91. The result was a grade 1 classification, "no visible attack".

Thus, the tests showed the excellent chemical resistance of the coatings according to the invention for applications as a pharmaceutical packaging.

DETAILED DESCRIPTION

Figure 1:
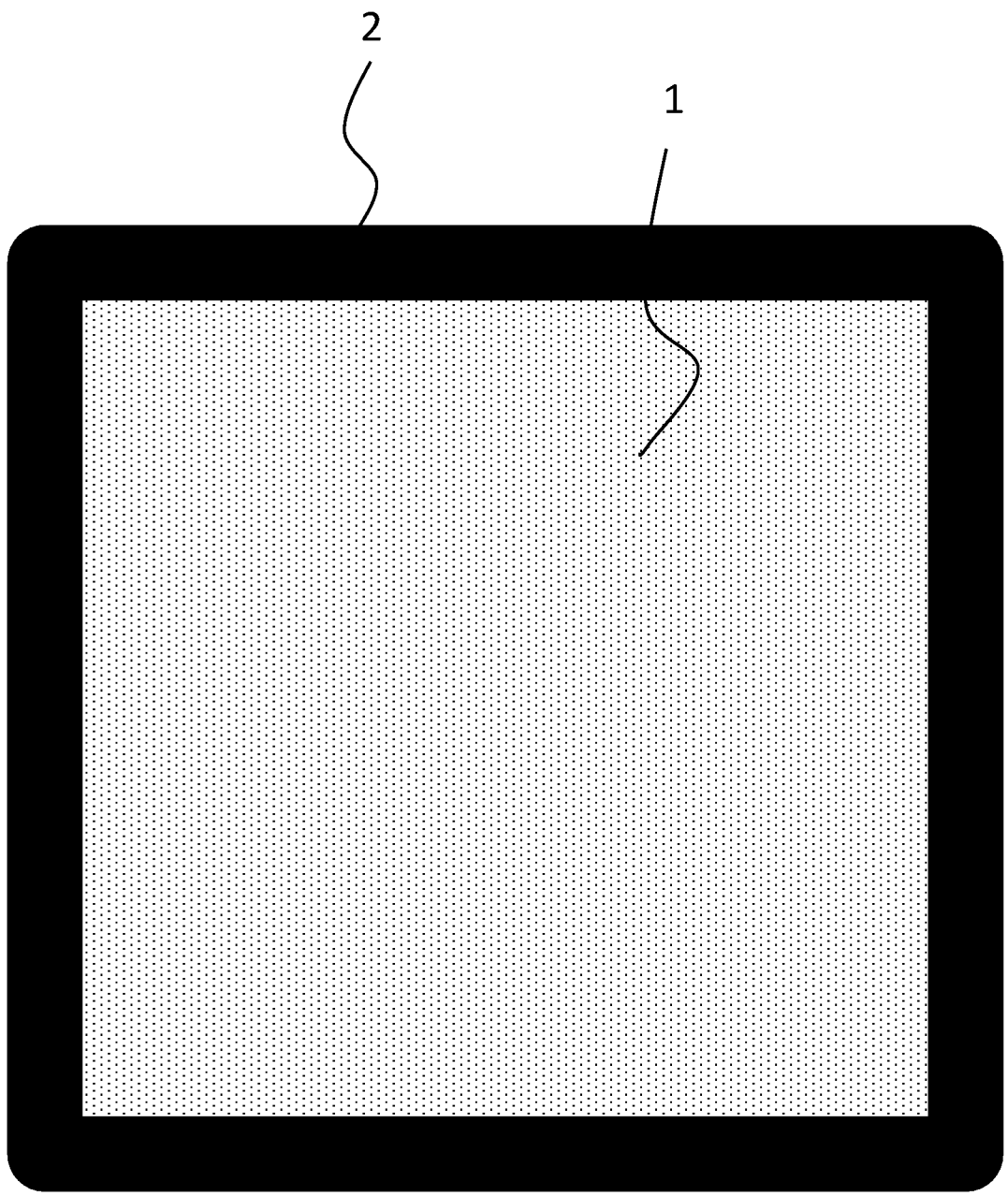
FIG. 1 schematically shows a glass substrate of the present disclosure.

FIG. 1 schematically shows a glass substrate 1 made of a borosilicate glass which is provided with a coating 2 in a peripheral area thereof, which visually gives the impression of a frame.

It will be understood that the coating according to the invention is likewise suitable for applying scales, a zone boundary of a cooktop zone, and for applying labels, for example.

Figure 2:
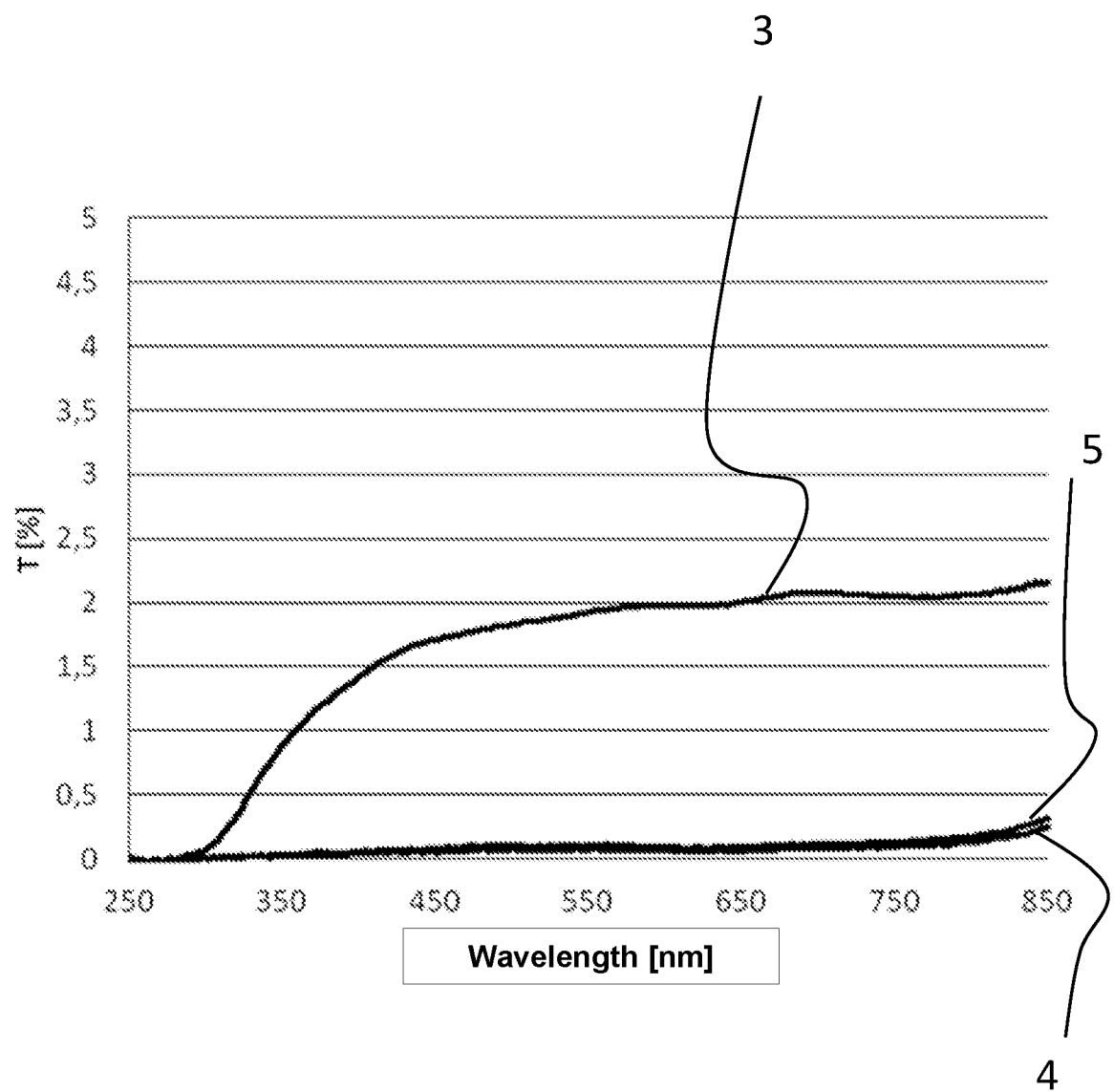
FIG. 2 shows the transmission behavior of different coatings.

FIG. 2 shows the transmission behavior of different coatings.

On the x-axis the wavelength is plotted, and on the y-axis transmittance in percent.

Curve 3 represents the transmittance profile of a commercially available single layer enamel. This is a glaze comprising a glass frit with a high proportion of bismuth oxide and pigments including Cr and Cu components.

It can be seen that for a wavelength range starting at about 450 μm and above, transmittance is greater than 1% and increases to 2%. Therefore, the coating is not opaque.

Curve 4 represents the coating produced from Example 2 and curve 5 from Example 3 of Table 1 and fired.

As can be seen, for both coatings transmittance is well below 0.5% over the entire range of wavelengths of visible light.

Thus, the coating is opaque.

The invention permits to provide an easily appliable, cost-efficient and opaque enamel coating for glasses having a low thermal expansion coefficient.

Figure 3:
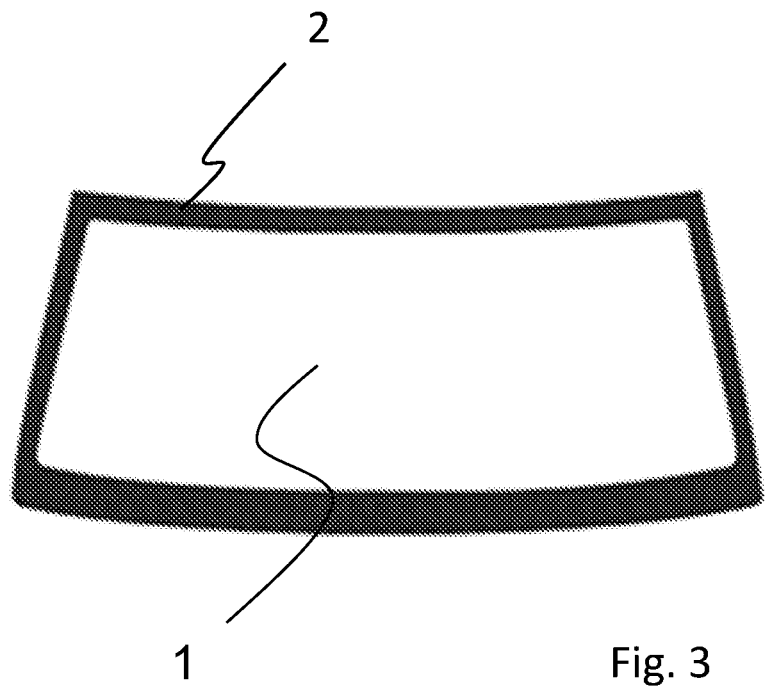
FIG. 3 is a schematic view of a bullet-proof security glazing of the present disclosure.

FIG. 3 is a schematic view of a bullet-proof security glazing which comprises a substrate 1 consisting of a plurality of glass and/or glass ceramic layers and polymer layers which are laminated to form a composite.

At the peripheral area, the sheet is provided with an opaque coating 2 that forms a frame which covers adhesive seams, for example.

Figure 4:
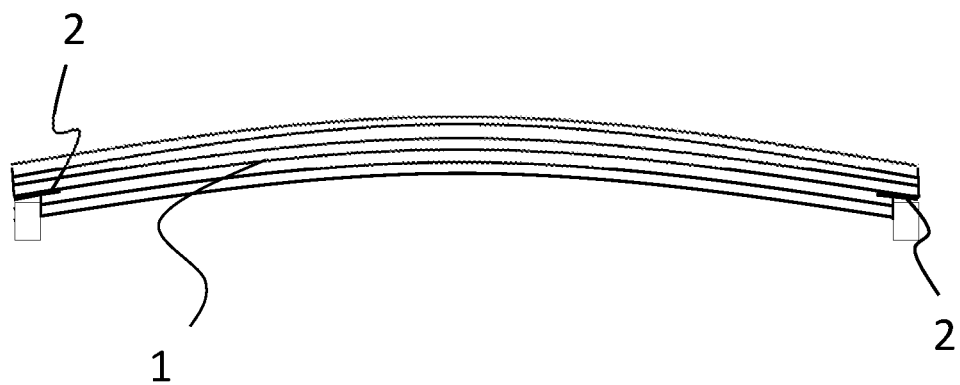
FIG. 4 is a schematic sectional view of the sheet illustrated in FIG. 3.

FIG. 4 is a schematic sectional view of the sheet illustrated in FIG. 3. As can be seen, the outer layers of the composite are projecting, and the opaque coating 2 is partially deposited between the panes of the composite and partially on the underside of the composite.

The coating material of the invention exhibits high scratch resistance and does not discolor during autoclaving of the laminate.

Figure 5:
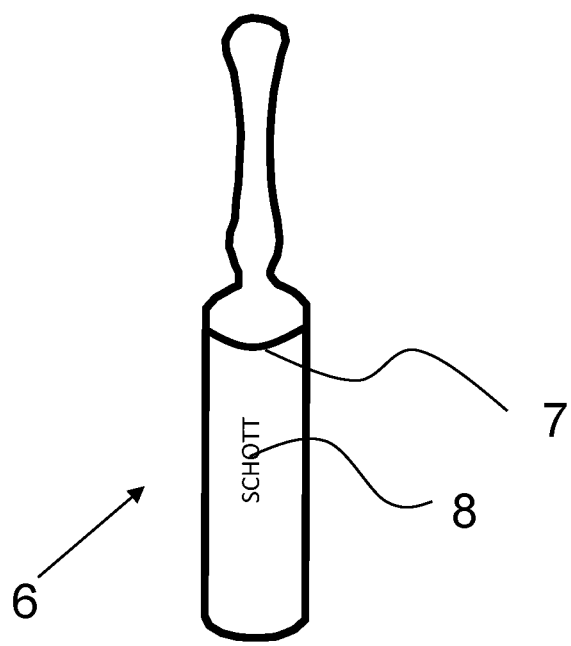
FIG. 5 shows a pharmaceutical packaging having the coating of the invention.

FIG. 5 shows a pharmaceutical packaging 6 in the form of a glass ampoule. In this case, the coating of the invention can be used, for example, to apply the mark 7 or a label 8.

What is claimed is:

1. A coated glass substrate, comprising:
   a glass substrate having a coefficient of linear thermal expansion α at 20° C. to 300° C. of up to $5.5*10^{-6}$; and
   an opaque coating applied to the glass substrate as a glass flux material, the glass flux material including at least one pigment and a glass component, the glass component comprising:
   $SiO_2$ 58-65 mol %,
   $Al_2O_3$ 2.5-3.6 mol %,
   $Bi_2O_3$ 0.5-2 mol %, and
   $B_2O_3$ 18-25 mol %,
   with at least 2.5 mol % of at least one oxide of the group $Li_2O$, $Na_2O$ and $K_2O$, and
   a ratio of alkali oxides to aluminum oxide $\Sigma R_2O/Al_2O_3$ that is greater than 2.1 and less than 6,
   wherein the glass component has a softening temperature of less than 680° C.

2. The coated glass or glass ceramic substrate as claimed in claim 1, wherein the ratio of alkali oxides to aluminum oxide $\Sigma R_2O/Al_2O_3$ is greater than 2.1 and less than 4.5.

3. The coated glass or glass ceramic substrate as claimed in claim 1, wherein the glass component comprises:
   $Li_2O$ 0-15 mol %,
   $Na_2O$ 0-12 mol %, and
   $K_2O$ 0-4 mol %.

4. The coated glass or glass ceramic substrate as claimed in claim 1, wherein the glass component further comprises at least one material selected from the group consisting of up to 2 mol % of $ZrO_2$, up to 2 mol % of $TiO_2$, up to 3 mol % of alkaline earth metal oxides, up to 3 mol % of ZnO, and combinations thereof.

5. The coated glass or glass ceramic substrate as claimed in claim 1, wherein the glass flux material is provided in form of a paste including a ground glass component, wherein the ground glass component has a particle size distribution with $d_{50}$ between 1.2 and 2.5 μm.

6. The coated glass or glass ceramic substrate as claimed in claim 1, wherein the opaque coating has a thickness of more than 4 μm.

7. The coated glass or glass ceramic substrate as claimed in claim 1, wherein the coated glass substrate is employed for a use selected from the group consisting of a bullet-proof glass laminate composite, a fireplace window, a pyrolysis oven window, a fire protection glazing, a lamp, and a pharmaceutical packaging.

8. The coated glass or glass ceramic substrate as claimed in claim 1, wherein the glass component comprises at least 2.5 mol % of $Li_2O$.

9. The coated glass or glass ceramic substrate as claimed in claim 1, wherein the $\Sigma R_2O$ is at least 8 mol %.

10. The coated glass or glass ceramic substrate as claimed in claim 9, wherein the $\Sigma R_2O$ is less than 18 mol %.

11. The coated glass or glass ceramic substrate as claimed in claim 1, wherein the glass flux-based coating has, in L*a*b* color space, an L* value of more than 86 or less than 27, and an a* value of less than 0.05, and a b* value of less than 0.05.

12. The coated glass or glass ceramic substrate as claimed in claim 1, wherein the glass flux-based coating is lead free.

13. A glass flux material for applying an opaque coating, comprising:
   a paste of at least one pigment and a glass component, the glass component comprising:
   $SiO_2$ 58-65 mol %,
   $Al_2O_3$ 2.5-3.6 mol %,
   $Bi_2O_3$ 0.5-2 mol %, and
   $B_2O_3$ 18-25 mol %,
   with at least 2.5 mol % of at least one oxide of the group $Li_2O$, $Na_2O$, and $K_2O$, and
   a ratio of alkali oxides to aluminum oxide $\Sigma R_2O/Al_2O_3$ that is greater than 2.1 and less than 6,
   wherein the glass component is ground and has a particle size distribution with a d50 between 1.2 and 2.5 mm, and
   wherein the glass component has a softening temperature of less than 680° C.

14. The glass flux material as claimed in claim 13, wherein the glass component comprises at least 2.5 mol % of $Li_2O$.

15. A coated glass c, comprising:
   a glass substrate having a coefficient of linear thermal expansion α at 20° C. to 300° C. of up to $5.5*10^{-6}$/K; and
   a glass flux-based coating having a coefficient of linear thermal expansion α at 20° C. to 300° C. of less than $7*10^{-6}$/K, wherein the glass flux-based coating comprises at least one pigment and a glass component, the glass component comprising at least 2.5 mol % of $Li_2O$, 2.5 to 3.6 mol % of $Al_2O_3$, 18 to 25 mol % of $B_2O_3$, and a ratio of alkali oxides to aluminum oxide $\Sigma R_2O/Al_2O_3$ that is greater than 2.1 and less than 6, and wherein the glass flux-based coating exhibits a transmittance of less than 1% in a wavelength range from 380 to 780 nm.

16. The coated glass or glass ceramic substrate as claimed in claim 15, wherein the transmittance of the glass flux-based coating is less than 0.5%.

17. The coated glass or glass ceramic substrate as claimed in claim 15, wherein the glass flux-based coating comprises pigments with a degree of volume filling from 10 to 60%.

18. The coated glass or glass ceramic substrate as claimed in claim 15, wherein the substrate is curved, at least in portions thereof.

19. The coated glass or glass ceramic substrate as claimed in claim 15, wherein the substrate is a multilayer composite.

20. The coated glass or glass ceramic substrate as claimed in claim 15, wherein the glass flux-based coating has a thickness of more than 5 μm.

21. The coated glass or glass ceramic substrate as claimed in claim 15, wherein the glass flux-based coating has, in L*a*b* color space, an L* value of more than 86 or less than 28.

22. The coated glass or glass ceramic substrate as claimed in claim 15, wherein the glass flux-based coating has, in L*a*b* color space, an a* value and a b* value of less than 1.

23. A coated glass substrate, comprising:
- a glass substrate having a coefficient of linear thermal expansion $\alpha$ at 20° C. to 300° C. of up to $5.5*10^{31}$ $^6$/K; and
- an opaque coating applied to the glass substrate as a glass flux material, the glass flux material including at least one pigment and a glass component, the glass component comprising:
- $SiO_2$ 58-65 mol %,
- $Al_2O_3$ 2.5-3.6 mol %,
- $Bi_2O_3$ 0.5-2 mol %,
- $B_2O_3$ 18-25 mol %, and
- at least 2.5 mol % of an alkali oxide selected from the group consisting of $Li_2O$, $Na_2O$, $K_2O$, and any combinations thereof,
- wherein the glass component comprises a ratio of the alkali oxide to aluminum oxide that is greater than 2.1 and less than 6, and the glass component comprises a sum of alkali oxides that is at least 8 mol %.

24. The glass flux material as claimed in claim 23, wherein the substrate is made of borosilicate glass.

25. A glass flux material for applying an opaque coating, comprising:
- a paste of at least one pigment and a glass component, the glass component comprising:
- $SiO_2$ 58-65 mol %,
- $Al_2O_3$ 2.5-3.6 mol %,
- $Bi_2O_3$ 0.5-2 mol %,
- $B_2O_3$ 18-25 mol %, and
- with at least 2.5 mol % of at least one oxide of the group $Li_2O$, $Na_2O$, and $K_2O$, and
- a ratio of alkali oxides to aluminum oxide $\Sigma R_2O/Al_2O_3$ that is greater than 2.1 and less than 6,
- wherein the glass component is ground and has a particle size distribution with a d50 between 1.2 and 2.5 μm, and
- wherein $Na_2O$ is present in an amount that is less than 5 mol % and/or in an amount that is less than an amount of $Al_2O_3$.

26. The glass flux material as claimed in claim 25, wherein $Na_2O$ is less than or equal to 1.3 mol %.

* * * * *

UNITED STATES PATENT AND TRADEMARK OFFICE
CERTIFICATE OF CORRECTION

| | |
|---|---|
| PATENT NO. | : 12,103,890 B2 |
| APPLICATION NO. | : 15/225555 |
| DATED | : October 1, 2024 |
| INVENTOR(S) | : Ina Mitra et al. |

It is certified that error appears in the above-identified patent and that said Letters Patent is hereby corrected as shown below:

In the Claims

In Claim 1, Column 11, Line 27 should be changed from "glass substrate" to --glass or glass ceramic substrate--

In Claim 1, Column 11, Line 29 should be changed from "up to 5.5 * 10-6" to --up to 5.5 * 10-6/K--

In Claim 13, Column 12, Line 32 should be changed from "between 1.2 and 2.5 mm" to --between 1.2 and 2.5 µm--

In Claim 15, Column 12, Line 39 should be changed from "coated glass c substrate" to --coated glass or glass ceramic substrate--

In Claim 23, Column 13, Line 11 should be changed from "up to 5.5*10 31 -6/K" to --"up to 5.5*10-6/K--

In Claim 25, Column 14, Line 11 should be changed from "0.5 - 2 mol %," to --0.5 - 2 mol %, and--

In Claim 25, Column 14, Line 12 should be changed from "18 - 25 mol %, and" to --"18 - 25 mol %,--

Signed and Sealed this
Twenty-sixth Day of November, 2024

Katherine Kelly Vidal
*Director of the United States Patent and Trademark Office*